Jan. 16, 1940.                D. McDONALD                 2,187,210
                          STORAGE TANK GAUGE
                           Filed May 3, 1937
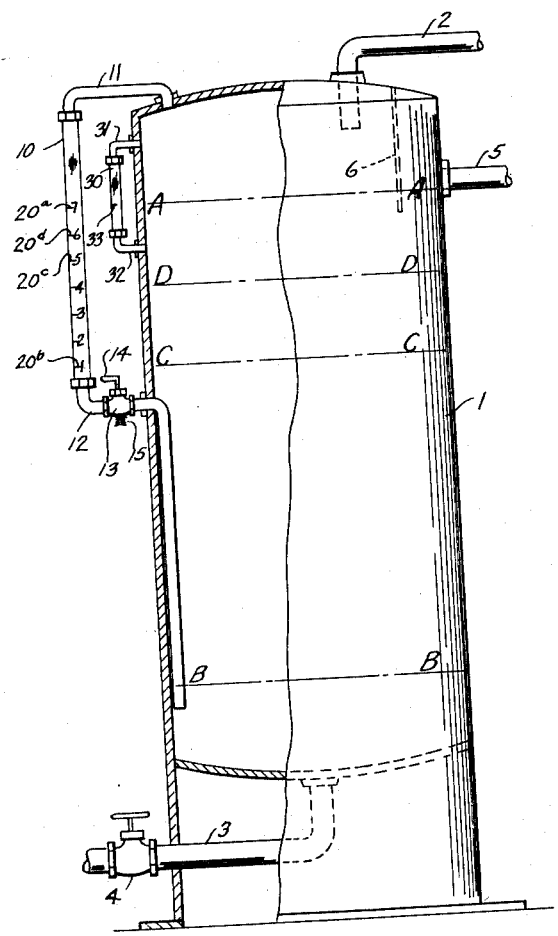
INVENTOR.
Dan McDonald Patented Jan. 16, 1940

2,187,210

UNITED STATES PATENT OFFICE 2,187,210

STORAGE TANK GAUGE

Dan McDonald, Los Angeles, Calif., assignor to Engineering Incorporated, Los Angeles, Calif., a corporation of California Application May 3, 1937, Serial No. 140,446

3 Claims. (Cl. 73—299)

This invention is a means for gauging variable quantities of a fluid stored in a container in which a supernatant fluid of different specific gravity may fill any portion of the container which is not occupied by the stored fluid.

It is the object of the invention to gauge the stored fluid by a sight glass which is calibrated in accordance with specific gravity differential between the stored and supernatant fluids and in accordance with varying proportions of the fluids in the container, so that the level of the stored fluid as shown by the sight glass indicates that quantity of the stored fluid which is contained in the storage receptacle.

It is a further object of the invention to connect the sight glass to the storage receptacle so that the stored fluid may rise in the sight glass to a level determined by the varying proportions and specific gravity differential of the stored and supernatant fluids, whereby in accordance with this specific gravity differential the level of the stored fluid in the sight glass may differ from but is proportional to its level in the storage container, and to calibrate the sight glass so that its graduations indicate the quantity of stored fluid in accordance with this proportional level differential.

The invention will be readily understood from the following description of the accompanying drawing which is a front elevation, partly in axial section, of a storage tank provided with my improved gauge.

The invention is applicable to any container for immiscible fluids of different specific gravity and wherein the supernatant fluid may fill any variable portion of the container which is not occupied by the heavier fluid which it is desired to gauge; and the invention is particularly applicable and is therefore hereinafter described with reference to a container for a relatively heavy volatile solvent such as trichlorethylene and a supernatant liquid such as water. For example, the container may be a solvent storage tank for a dry-cleaning system wherein the used solvent, after regeneration, and containing more or less water, is returned to storage for separating the solvent from the water by specific gravity differential.

The solvent and the water may be returned to a storage tank 1 via conduit 2, with the heavier solvent which settles below the water then stored in the tank for subsequent withdrawal via the conduit 3 when needed for reuse in the dry-cleaning system, the conduit 3 being preferably provided with a suitable valvular control 4. The water which separates and collects above the solvent is preferably withdrawn via a conduit 5, a baffle 6 being preferably provided in the storage tank to prevent the incoming flow discharging directly via the conduit 5 without first settling so as to separate its solvent and water constituents.

Maximum storage capacity of the storage tank 1 is thus indicated by the level A—A at which the fluid starts to overflow via the conduit 5; and when the tank is filled to this level the solvent collects in the lower portion of the tank, and the water which separates from the solvent collects in any remaining space in the upper portion of the tank, between the solvent level and the overflow level. The capacity of the tank is preferably such that when all the solvent has been returned to the storage tank from the dry-cleaning system, e. g. when the plant is shut down, the solvent level is some distance below the level A—A, as shown for example at D—D, so as to prevent loss of solvent via the overflow conduit 5; and the system in which the storage tank is employed is preferably such that all of the solvent is never withdrawn from the storage tank, this minimum solvent level being shown for example at B—B.

The present invention provides for gauging the quantity of solvent in the storage tank when the solvent is at its maximum or minimum level, or when it is at any intermediate level such as indicated at C—C.

For this purpose a vertical sight glass 10 is provided at the exterior of the storage tank, with couplings 11—12 at its ends communicating with the storage tank above the overflow level A—A and below the minimum solvent level B—B respectively. A stop cock 13 may be provided in the coupling 12, and is preferably of a type which is adapted to be manually opened by a handle 14, but which is normally closed, as for example by a spring 15, so as to remain open only as long as held by the operator. The sight glass is thus normally inoperative, but may be rendered operative by opening the stop cock 13, whereupon solvent from the tank 1 rises in the sight glass via the coupling 12.

If the storage tank should be filled with solvent to the overflow level A—A, the solvent would rise to the same level in the sight glass 10, since the solvent column in the sight glass would be balanced by a similar solvent height in the storage tank, with no water trapped in the storage tank above the solvent; but when the solvent stands in the storage tank to any lower level such as B—B, C—C or D—D, with supernatant water filling the storage tank to its overflow level A—A, the column of solvent which rises in the sight glass will be of greater height than the solvent height in the storage tank, since the solvent column in the sight glass is balanced by the solvent height in the storage tank plus the height of the supernatant water. Furthermore, this solvent level differential is dependent upon specific gravity differential between the supernatant water and the particular solvent which is being stored.

The sight glass 10 is calibrated so that any reading denoted by the column of solvent in the sight glass, will indicate the quantity of solvent in the storage tank in accordance with any solvent level differential in the sight glass and in the storage tank, as detremined by the varying proportions of solvent and supernatant water which may fill the storage tank to the overflow level A—A and as determined by specific gravity differential between the water and the particular solvent. For this purpose a series of graduations are provided on the sight glass 10.

The uppermost graduation 20$^a$ may be at the same level as the overflow level A—A and which is the level to which the solvent would rise in the sight glass if solvent filled the storage tank to its overflow level A—A, with no body of fluid of different specific gravity trapped in the upper portion of the storage tank above the solvent. This graduation 20$^a$ is calibrated in accordance with the storage capacity of the tank if it were filled with solvent to the level A—A, e. g. in the illustrated embodiment the graduation 20$^a$ has an index "7", to indicate that the tank has a storage capacity of 700 gals. if filled with solvent to its overflow level A—A.

The lowermost graduation 20$^b$ is at that level to which the solvent rises in the sight glass, in accordance with specific gravity differential between the particular solvent and a particular supernatant fluid, when the solvent level in the storage tank is at a predetermined minimum level B—B, with the particular supernatant fluid trapped in and filling the upper portion of the storage tank between the solvent level B—B and the overflow level A—A. In other words, the solvent stored in the tank 1 to the level B—B will raise the solvent column in the coupling 12 to a similar level, and the supernatant fluid filling the storage tank between B—B and A—A will then raise this solvent column to a still higher level, i. e. to the graduation 20$^b$ of the sight glass. This graduation 20$^b$ is calibrated in accordance with the storage capacity of the tank when it is filled with solvent to the level B—B, e. g. in the illustrated embodiment the graduation 20$^b$ is marked with the numeral "1" to indicate that the tank has a storage capacity of 100 gallons when filled with solvent to the level B—B.

The position of the graduation 20$^b$ may be readily determined, in accordance with the specific gravity differential between the particular solvent and the particular supernatant fluid which are to be stored in the tank 1, i. e. the distance between the level B—B and the graduation 20$^b$ is to the distance between the levels B—B and A—A, as the density of the supernatant fluid in the storage tank is to the density of the solvent which is being stored. For example, when the sight glass is to be calibrated for storage of trichlorethylene, with water as the supernatant fluid, the graduation 20$^b$ is positioned at a distance above the level B—B, which is two-thirds of the distance between the levels B—B and A—A, since the specific gravity of trichlorethylene is 1.5.

The intermediate graduations of the sight glass are calibrated in similar manner, i. e. these graduations are at various intermediate levels to which the solvent rises in the sight glass and which correspond to proportionately lower levels of the solvent in the storage tank, as determined by specific gravity differential between the particular solvent and a particular supernatant fluid which fills the storage tank between the solvent level and the overflow level A—A; and each of the intermediate graduations is marked with a numeral which indicates the storage capacity of the tank when it is filled with solvent to the level which will raise the solvent column in the sight glass to that particular graduation. For example, the intermediate graduation 20$^c$ represents a solvent level in the storage tank as shown at C—C (the distance between C—C and 20$^c$ being to the distance between C—C and A—A, as the density of the supernatant fluid is to the density of the solvent which is being stored); and the index "5" at the graduation 20$^c$, indicates that the tank has a storage capacity of 500 gallons when filled with solvent to the level C—C.

In similar manner the graduation 20$^d$, calibrated in the same manner, may indicate the level D—D beyond which it is desirable that the storage tank never be filled with solvent, in order that overflow and loss of solvent may be avoided; and the index "6" at the graduation 20$^d$, indicates that the tank has a storage capacity of 600 gallons when filled with solvent to this recommended maximum solvent level D—D.

The means as thus described for gauging variable quantities of a fluid stored in a container, is dependent upon a supernatant fluid standing to a predetermined level in any portion of the container which is not occupied by the fluid which is to be gauged. In other words, with the gauge as illustrated, its operation is dependent upon either the solvent or any supernatant water standing at the overflow level A—A. Means are preferably provided whereby the operator, before opening the stop cock 13 to operate the gauge, may be assured that the storage tank is filled with fluid to the overflow level A—A. For this purpose a vertical sight glass 30 may be provided at the exterior of the storage tank 1, with couplings 31—32 at the ends of the sight glass communicating with the interior of the storage tank above and below the overflow level A—A respectively. Communication of the lower coupling 32 with the interior of the storage tank is preferably above the maximum level D—D to which it is desirable that the storage tank be filled with solvent, so that only supernatant water, and not solvent, will enter the sight glass 30 and thus rise therein to the same level as the supernatant water in the storage tank; and an index 33 is preferably provided on the sight glass 30, at the same level as the overflow level A—A, to indicate by the fluid standing in the sight glass at the index 33, that the supernatant fluid is filling the storage tank to its overflow capacity.

The invention thus provides simple but accurate means for gauging variable quantities of a fluid stored in a container in which a supernatant fluid of different specific gravity may fill to a predetermined level any portion of the container which is not occupied by the fluid which is to be gauged; and the invention is thus particularly applicable to storage tanks for dry-cleaning systems and the like wherein a volatile solvent is stored with water overlying the solvent to prevent escape of solvent vapors, with the solvent withdrawn from storage as needed in the dry-cleaning system, and after use and regeneration, returned to storage for separation of any water which may be present with the solvent, and with the separated supernatant water maintaining the storage tank filled to a predetermined overflow level.

I claim:

1. A gauge for a storage tank for immiscible liquids which stratify by specific gravity differential, comprising a sight glass, conduits at the ends of the sight glass communicating with the storage tank respectively above a maximum level of the immiscible liquids contained in the storage tank and below a minimum level of separation between said liquids so that the heavier liquid rises through the lower conduit to that level in the sight glass at which it is balanced by the immiscible liquids contained in the storage tank, a scale for the sight glass so calibrated in accordance with specific gravity differential of the immiscible liquids that when said liquids fill the storage tank to the aforesaid maximum level the length of the scale which is indicated by the level at which the heavier liquid then stands in the sight glass is proportional to the level of separation between the immiscible liquids contained in the storage tank, and a second sight glass communicating at its ends with the storage tank respectively above the aforesaid maximum level of the immiscible liquids contained in the storage tank and above a maximum level of separation between said liquids.

2. A gauge for a storage tank for immiscible liquids which stratify by specific gravity differential, comprising a sight glass, a conduit at the lower end of the sight glass communicating with the storage tank below a minimum level of separation between the immiscible liquids contained in the storage tank so that the heavier liquid rises through the conduit to that level in the sight glass at which it is balanced by the immiscible liquids contained in the storage tank, a scale for the sight glass so calibrated in accordance with specific gravity differential of the immiscible liquids that when said liquids fill the storage tank to a maximum level the length of the scale which is indicated by the level at which the heavier liquid then stands in the sight glass is proportional to the level of separation between the immiscible liquids contained in the storage tank, and means for indicating whether the immiscible liquids are filling the storage tank to the aforesaid maximum level.

3. A gauge for a storage tank for immiscible liquids which stratify by specific gravity differential, comprising a receptacle communicating with the storage tank so that liquid rises in the receptacle to that level at which it is balanced by the immiscible liquids contained in the storage tank, a scale cooperating with the liquid in the receptacle and so calibrated in accordance with specific gravity differential of the immiscible liquids that when said liquids fill the storage tank to a maximum level the length of the scale which corresponds to the level of the liquid in the receptacle is proportional to the level of separation between the immiscible liquids contained in the storage tank, and means for indicating whether the immiscible liquids are filling the storage tank to the aforesaid maximum level.

DAN McDONALD.